United States Patent
Yu et al.

(12)

(10) Patent No.: US 12,248,599 B1
(45) Date of Patent: Mar. 11, 2025

(54) CENTRALIZED DATA RETENTION AND DELETION SYSTEM

(71) Applicant: Palantir Technologies Inc., Palo Alto, CA (US)

(72) Inventors: Alice Yu, San Francisco, CA (US); Michal Duczynski, Pecice (PL); Yeong Wei Wee, London (GB)

(73) Assignee: Palantir Technologies Inc., Denver, CO (US)

( * ) Notice: Subject to any disclaimer, the term of this patent is extended or adjusted under 35 U.S.C. 154(b) by 1151 days.

(21) Appl. No.: 16/525,166

(22) Filed: Jul. 29, 2019

Related U.S. Application Data

(60) Provisional application No. 62/873,096, filed on Jul. 11, 2019.

(51) Int. Cl.
*G06F 7/00* (2006.01)
*G06F 16/338* (2019.01)
*G06F 16/34* (2019.01)
*G06F 21/62* (2013.01)

(52) U.S. Cl.
CPC ........ *G06F 21/6245* (2013.01); *G06F 16/338* (2019.01); *G06F 16/345* (2019.01); *G06F 2221/2143* (2013.01)

(58) Field of Classification Search
CPC .. G06F 16/338; G06F 16/345; G06F 21/6245; G06F 2221/2143
USPC .............. 707/805, 806, 802, 803, 602, 626; 709/39, 41, 14.17, 26.4, 26.9, 7.17, 71
See application file for complete search history.

(56) References Cited

U.S. PATENT DOCUMENTS

| | | | |
|---|---|---|---|
| 7,668,853 B2 * | 2/2010 | Trepess | G06F 16/358 715/848 |
| 8,429,630 B2 | 4/2013 | Nickolov et al. | |
| 9,461,876 B2 | 10/2016 | Van Dusen et al. | |
| 10,552,994 B2 * | 2/2020 | Yousaf | G06T 11/206 |
| 10,764,254 B2 | 9/2020 | Ford et al. | |
| 11,138,279 B1 * | 10/2021 | White | G06F 16/215 |
| 11,271,983 B2 | 3/2022 | Chegini | |
| 2006/0075001 A1 * | 4/2006 | Canning | G06F 8/65 707/999.203 |
| 2009/0150431 A1 * | 6/2009 | Schmidt | G06F 16/284 |
| 2014/0279865 A1 * | 9/2014 | Kumar | G06F 16/904 707/754 |
| 2016/0179852 A1 * | 6/2016 | Naibo | G06F 16/2465 707/805 |

(Continued)

FOREIGN PATENT DOCUMENTS

WO  WO 2017187207 A1 * 11/2017 ........... H04L 9/3247

*Primary Examiner* — Md I Uddin
(74) *Attorney, Agent, or Firm* — Knobbe, Martens, Olson & Bear, LLP

(57) ABSTRACT

Disclosed herein are systems and techniques for centralized data retention and deletion. Data can be ingested from multiple external data sources and saved internally for use to process data modification (e.g., deletion) requests via a data processing pipeline, which may apply eligibility checks and modification logic to determine the appropriate modifications to the relevant data items to comply with the data modification request. Various user interfaces may be generated to provide a user with oversight of the data processing pipeline and the data modifications. The user may review and trigger the modification of data stored at the external data sources and/or internally.

16 Claims, 9 Drawing Sheets

(56) References Cited

U.S. PATENT DOCUMENTS

| | | | |
|---|---|---|---|
| 2016/0180557 A1* | 6/2016 | Yousaf | G06F 16/334 715/762 |
| 2018/0262533 A1 | 9/2018 | McCaig et al. | |
| 2019/0215344 A1* | 7/2019 | Barday | H04L 63/0407 |
| 2021/0056116 A1 | 2/2021 | Sullivan et al. | |

* cited by examiner

CENTRALIZED DATA RETENTION AND DELETION SYSTEM

INCORPORATION BY REFERENCE TO ANY PRIORITY APPLICATIONS

This application claims benefit of U.S. Provisional Patent Application No. 62/873,096, entitled "CENTRALIZED DATA RETENTION AND DELETION SYSTEM," filed Jul. 11, 2019, which is hereby incorporated by reference in its entirety.

Any and all applications for which a foreign or domestic priority claim is identified in the Application Data Sheet as filed with the present application are hereby incorporated by reference under 37 CFR 1.57.

TECHNICAL FIELD

The present disclosure relates to systems and techniques for centralized data retention, modification, and deletion. More specifically, a centralized system can be used to process and review data modification (e.g., deletion) requests and then perform the modification of relevant data that is stored internally and/or across multiple external data sources.

BACKGROUND

Data controllers may store large quantities of data associated with a subject (e.g., an individual) that continues to accrue over time. In some instances, some or all of the data associated with the subject may have to be modified or deleted. For instance, under the EU General Data Protection Regulation (GDPR), the subject is provided with the right to file a right-to-be-forgotten (RTBF) request to have the data controller delete some or all of the data associated with the subject. Thus, data controllers must limit storage and enable erasure of data associated with a data subject (e.g., individual), upon request by the data subject.

However, handling these data deletion requests is not a simple matter and can be problematic because the data associated with a subject may be stored across multiple different data sources and tables within those data sources, and there may be numerous dependencies associated with the data. In addition to deletion requests by users, the system must also be required to ensure proper implementation of retention logic in an automated fashion for each data source, e.g., some data may need to be deleted on a regular rolling basis based on a predefined expiration policy. Once data is flagged and prepared for deletion, there also need to be safeguards against improper deletion, which can result in noncompliance or affect other data stored at the data sources. Typically, the data controller may go into every available data source, look at the data and determine if the data is eligible for deletion, and then expunge the data. This process of determining the data to be deleted is cumbersome and also lacks both manual and automated checks for potential deletion mistakes.

SUMMARY

Disclosed herein are systems and techniques for centralized data retention, modification, and deletion. A data retention and deletion system may ingest data from multiple external data sources. The data can be ingested periodically to be cumulatively stored and logged internally for use to process data modification (e.g., deletion) requests via a data processing pipeline.

The data retention and deletion system may receive a data modification request associated with a data subject. The system may perform eligibility checks (e.g., to confirm the identity of the data subject and their eligibility for requesting data deletion), if applicable. The system may also determine a list of search terms associated with the identity of the data subject, which can include any information related to the data subject, such as account identifiers, unique identifiers (e.g., social security numbers), and so forth. As an example of this, the system may determine a list of all the account identifiers associated with that data subject's identity that are eligible for deletion.

The data retention and deletion system may run a search on the internally stored derivative datasets to identify all the data associated with the search terms (e.g., account identifiers) of the data subject, such as by searching the derivative datasets for a search term (e.g., the account identifier(s) associated with the subject). Once all the relevant data is located within the derivative datasets, the data retention and deletion system may identify the external data sources associated with that data. For example, if there is a derived dataset containing a search term, the data retention and deletion system may trace the flow of data backwards to identify the corresponding source dataset/database and external data source that the derived dataset was obtained from. The data retention and deletion system may further apply modification logic to relevant data items to determine the appropriate modifications that should be applied to the relevant data items in order to comply with the data modification request.

Various user interfaces may be generated to provide a user with oversight of the data processing pipeline and the proposed data modifications. These user interfaces may include a dashboard user interface that provides a visualization of the proposed data modifications and how the data tables would look after modification occurs, which can be used to make a decision on deletion. The user interfaces may also include a data flow user interface that provides a visualization of the data lineage/flow and relationships between each of the steps of the data processing pipeline, which can also be used to make a decision on deletion.

Through the user interfaces, the user may review the proposed data modifications before triggering the modification of the relevant data stored at the external data sources and/or internally. For modification of the data stored at the external data sources, the data retention and deletion system may orchestrate the modifications (e.g., for deletion or anonymization) by generating the necessary scripts or code to delete the relevant data stored at the external data sources and push them out to the external data sources.

Accordingly, in various embodiments, large amounts of data are automatically and dynamically analyzed and modified interactively in response to user inputs, and the data is efficiently and compactly presented to a user by the system. Thus, in some embodiments, the user interfaces described herein are more efficient as compared to previous user interfaces in which data is not dynamically updated and compactly and efficiently presented to the user in response to interactive inputs.

Further, as described herein, the system may be configured and/or designed to generate user interface data useable for rendering the various interactive user interfaces described. The user interface data may be used by the system, and/or another computer system, device, and/or software program (for example, a browser program), to render the interactive user interfaces. The interactive user interfaces may be displayed on, for example, electronic displays (including, for example, touch-enabled displays).

Additionally, it has been noted that design of computer user interfaces "that are useable and easily learned by humans is a non-trivial problem for software developers." (Dillon, A. (2003) User Interface Design. MacMillan Encyclopedia of Cognitive Science, Vol. 4, London: MacMillan, 453-458.) The various embodiments of interactive and dynamic user interfaces of the present disclosure are the result of significant research, development, improvement, iteration, and testing. This non-trivial development has resulted in the user interfaces described herein which may provide significant cognitive and ergonomic efficiencies and advantages over previous systems. The interactive and dynamic user interfaces include improved human-computer interactions that may provide reduced mental workloads, improved decision-making, reduced work stress, and/or the like, for a user. For example, user interaction with the interactive user interfaces described herein may provide an optimized display of time-varying report-related information and may enable a user to more quickly access, navigate, assess, and digest such information than previous systems.

In some embodiments, data may be presented in graphical representations, such as visual representations, such as charts and graphs, where appropriate, to allow the user to comfortably review the large amount of data and to take advantage of humans' particularly strong pattern recognition abilities related to visual stimuli. In some embodiments, the system may present aggregate quantities, such as totals, counts, and averages. The system may also utilize the information to interpolate or extrapolate, e.g. forecast, future developments.

Further, the interactive and dynamic user interfaces described herein are enabled by innovations in efficient interactions between the user interfaces and underlying systems and components. For example, disclosed herein are improved methods of receiving user inputs, translation and delivery of those inputs to various system components, automatic and dynamic execution of complex processes in response to the input delivery, automatic interaction among various components and processes of the system, and automatic and dynamic updating of the user interfaces. The interactions and presentation of data via the interactive user interfaces described herein may accordingly provide cognitive and ergonomic efficiencies and advantages over previous systems.

Various embodiments of the present disclosure provide improvements to various technologies and technological fields. For example, as described above, existing data storage and processing technology (including, e.g., in memory databases) is limited in various ways (e.g., manual data review is slow, costly, and less detailed; data is too voluminous; etc.), and various embodiments of the disclosure provide significant improvements over such technology. Additionally, various embodiments of the present disclosure are inextricably tied to computer technology. In particular, various embodiments rely on detection of user inputs via graphical user interfaces, calculation of updates to displayed electronic data based on those user inputs, automatic processing of related electronic data, and presentation of the updates to displayed images via interactive graphical user interfaces. Such features and others (e.g., processing and analysis of large amounts of electronic data) are intimately tied to, and enabled by, computer technology, and would not exist except for computer technology. For example, the interactions with displayed data described below in reference to various embodiments cannot reasonably be performed by humans alone, without the computer technology upon which they are implemented. Further, the implementation of the various embodiments of the present disclosure via computer technology enables many of the advantages described herein, including more efficient interaction with, and presentation of, various types of electronic data.

In some embodiments, a system is contemplated that includes a computer readable storage medium having program instructions embodied therewith and one or more processors. The one or more processors may be configured to execute the program instructions to cause the system to: ingest data obtained from a plurality of external sources; receive a modification request associated with a data subject; using the ingested data, determine locations of relevant data for modification stored at the plurality of external sources, wherein the relevant data for modification is associated with account identifiers associated with the data subject; generate user interface data for a dashboard providing a visualization of the relevant data for modification; receive a confirmation to perform a modification operation; and issue instructions to modify the relevant data for modification stored at the plurality of external sources.

In various embodiments, the program instructions further cause the system to perform an eligibility check on the data subject. In various embodiments, the program instructions further cause the system to modify a portion of the ingested data that is associated with the relevant data for modification. In various embodiments, the program instructions further cause the system to generate user interface data for a data flow providing a visualization of a data processing pipeline followed by the system. In various embodiments, the instructions to modify the relevant data for modification stored at the plurality of external sources comprise a script. In various embodiments, the modification request is a request to delete data associated with the data subject that is stored at the plurality of external sources. In various embodiments, the dashboard further provides a visualization of the modification operation as it is applied to the relevant data for modification, wherein the modification operation is determined based on a set of pre-configured modification logic. In various embodiments, the dashboard further provides a visualization of the instructions to modify the relevant data for modification stored at the plurality of external sources. In various embodiments, a user interaction with the dashboard triggers the confirmation to perform the modification operation. In various embodiments, determining the relevant locations of relevant data for modification stored at the plurality of external sources may further include identifying a portion of the ingested data by searching the ingested data with the account identifiers associated with the data subject; and accessing metadata associated with the portion of the integrated data. In various embodiments, the program instructions further cause the system to perform an eligibility check on the account identifiers associated with the data subject. In various embodiments, the account identifiers associated with the data subject are provided by a user. In various embodiments, the dashboard further includes a form for inputting the account identifiers associated with the data subject. In various embodiments, the modification operation includes an anonymization or a deletion.

In some embodiments, a method is contemplated that includes ingesting data obtained from a plurality of external sources; receiving a modification request associated with a data subject; using the ingested data, determining locations of relevant data for modification stored at the plurality of external sources, wherein the relevant data for modification is associated with account identifiers associated with the data subject; generating user interface data for a dashboard providing a visualization of the relevant data for modification; receiving a confirmation to perform a modification operation; and issuing instructions to modify the relevant data for modification stored at the plurality of external sources.

In various embodiments, the method may further include performing an eligibility check on the data subject. In various embodiments, the method may further include modifying a portion of the ingested data that is associated with the relevant data for modification.

In some embodiments, a non-transitory computer storage media is contemplated that stores instructions that, when executed by one or more computers, cause the one or more computers to perform operations including ingesting data obtained from a plurality of external sources; receiving a modification request associated with a data subject; using the ingested data, determining locations of relevant data for modification stored at the plurality of external sources, wherein the relevant data for modification is associated with account identifiers associated with the data subject; generating user interface data for a dashboard providing a visualization of the relevant data for modification; receiving a confirmation to perform a modification operation; and issuing instructions to modify the relevant data for modification stored at the plurality of external sources.

In various embodiments, the instructions further cause the one or more computers to perform an eligibility check on the data subject. In various embodiments, the instructions further cause the one or more computers to modify a portion of the ingested data that is associated with the relevant data for modification.

Additional embodiments of the disclosure are described below in reference to the appended claims, which may serve as an additional summary of the disclosure.

In various embodiments, systems and/or computer systems are disclosed that comprise a computer readable storage medium having program instructions embodied therewith, and one or more processors configured to execute the program instructions to cause the one or more processors to perform operations comprising one or more aspects of the above- and/or below-described embodiments (including one or more aspects of the appended claims).

In various embodiments, computer-implemented methods are disclosed in which, by one or more processors executing program instructions, one or more aspects of the above- and/or below-described embodiments (including one or more aspects of the appended claims) are implemented and/or performed.

In various embodiments, computer program products comprising a computer readable storage medium are disclosed, wherein the computer readable storage medium has program instructions embodied therewith, the program instructions executable by one or more processors to cause the one or more processors to perform operations comprising one or more aspects of the above- and/or below-described embodiments (including one or more aspects of the appended claims).

DETAILED DESCRIPTION

Overview

Figure 1:
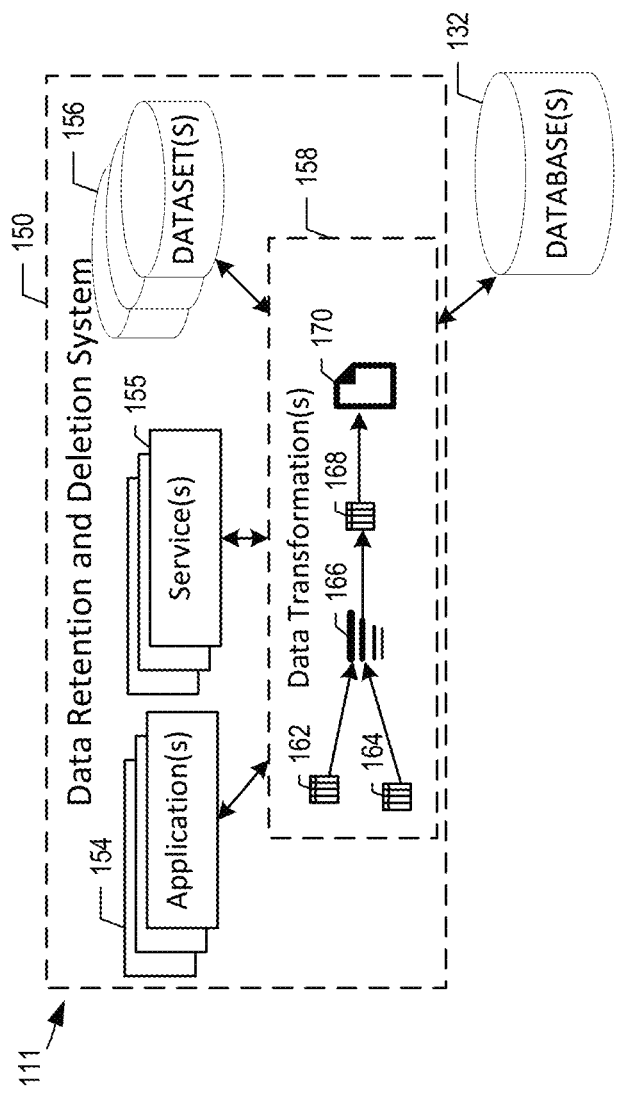
FIG. 1 is a block diagram illustrating a data retention and deletion system, according to some embodiments of the present disclosure.

A subject (e.g., an individual) may submit a modification request (e.g., a right-to-be-forgotten request) to a data controller to have the data controller modify (e.g., delete or overwrite) some or all of the data associated with the subject that the data controller has stored. Normally, the data controller would have to process their own deletion requests, which can be difficult because the data for the subject may be stored across multiple data sources and there may be numerous dependencies associated with the data.

A centralized data retention and deletion system can be used to streamline the processing of deletion requests, while also providing features for manual and automatic checks of the deletion process in order to prevent deletion mistakes from occurring. This data retention and deletion system can be simultaneously used by one or more data controllers to handle the processing of their deletion requests. However, for the purposes of facilitating the ease of understanding the data retention and deletion system, the processing of data modification requests is primarily described from the perspective of a single data controller.

The data retention and deletion system may periodically ingest (e.g., receive integrate, transform, and copy) data from the numerous external data sources that are used by the data controller to store data associated with subjects. The data retention and deletion system may store that ingested data internally (e.g., in an internal data store) as an internal copy (e.g., derivative datasets) to make it easier and more efficient to determine the relevant data to be deleted (e.g., at the external data sources) during the processing of a deletion request.

When the data retention and deletion system receives a modification request associated with a subject (e.g., an individual), the data retention and deletion system may either determine or request a list of search terms associated with the identity of the subject, which can include any information related to the data subject, such as account identifiers, unique identifiers (e.g., social security numbers), and so forth. These search terms can be used to locate the data associated with the subject. For instance, the data retention and deletion system may obtain account identifiers associated with the subject (e.g., from a database or from the deletion request itself) or prompt a user to provide a list of account identifiers, which the user may be able to input via a user interface (e.g., the dashboard user interface).

The data retention and deletion system may use the search terms to search on the internally stored data to locate data associated with the subject, which can then be used to determine the corresponding data at the external data sources and the appropriate modifications that need to be made. Before this happens, the data retention and deletion system may check the eligibility of each of those search terms, if applicable. For example, the data retention and deletion system may check the eligibility of each account identifier for modification against a set of eligibility logic. The data retention and deletion system may then locate the data associated with the eligible account identifiers, determine the relevant data items for modification and the appropriate manner of modification, and then quarantine that data. The data retention and deletion system may perform all of this using the internally stored copy of data.

There may be a user interface that provides a user (e.g., an administrator) a visualization of the data processing pipeline and the data dependencies. There may be a user interface that provides the user a visualization of the relevant data being modified (as well as the overall dataset before and after modification), which can be used for general validation and review.

If the user approves the modifications, then the data retention and deletion system may generate the necessary scripts to perform the modifications on the copy of the relevant data that is stored across the external data sources and push those scripts out to the external data sources. The data retention and deletion system may also make the modifications to the internally stored copy of the relevant data.

Terms

In order to facilitate an understanding of the systems and methods discussed herein, a number of terms are defined below. The terms defined below, as well as other terms used herein, should be construed to include the provided definitions, the ordinary and customary meaning of the terms, and/or any other implied meaning for the respective terms. Thus, the definitions below do not limit the meaning of these terms, but only provide example definitions.

Data Source: A location from which data comes. It can be a file, a particular database on a database management system (DBMS), a live data feed, a server, and so forth. A data store or a database may be examples of a data source.

Data Store: Any computer readable storage medium and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., solid state drives, random-access memory (RAM), etc.), and/or the like. Another example of a data store is a hosted storage environment that includes a collection of physical data storage devices that may be remotely accessible and may be rapidly provisioned as needed (commonly referred to as "cloud" storage).

Database: Any data structure (and/or combinations of multiple data structures) for storing and/or organizing data, including, but not limited to, relational databases (e.g., Oracle databases, PostgreSQL databases, etc.), non-relational databases (e.g., NoSQL databases, etc.), in-memory databases, spreadsheets, as comma separated values (CSV) files, extendible markup language (XML) files, TEXT (TXT) files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores.

Modification: Changing data by deletion, obfuscation, anonymization, overwriting, any combination of the foregoing, and/or the like.

FIGURES

FIG. 1 is a block diagram illustrating an example data retention and deletion system 150, according to some embodiments of the present disclosure. The data retention and deletion system 150 may correspond to the data retention and deletion system 200 described below with respect to FIG. 2. In some embodiments, the data retention and deletion system 150 may be implemented within a computing environment 111 that can include a database 132.

The example data retention and deletion system 150 includes one or more applications 154, one or more services 155, one or more initial datasets 156, and a data transformation process 158 (also referred to herein as a build process). The example data retention and deletion system 150 can include a data pipeline system. The data retention and deletion system 150 can transform data and record the data transformations. The one or more applications 154 can include applications that enable users to view datasets, interact with datasets, filter data sets, and/or configure dataset transformation processes or builds. The one or more services 155 can include services that can trigger the data transformation builds and API services for receiving and transmitting data. The one or more initial datasets 156 can be automatically retrieved from external sources and/or can be manually imported by a user. The one or more initial datasets 156 can be in many different formats such as a tabular data format (e.g., delimited or a spreadsheet data format), key-value pairs, a data log format (such as network logs), or time series data (such as sensor data).

The data retention and deletion system 150, via the one or more services 155, can apply the data transformation process 158. An example data transformation process 158 is shown. The data retention and deletion system 150 can receive one or more initial datasets 162, 164. The data retention and deletion system 150 can apply a transformation to the dataset(s). For example, the data retention and deletion system 150 can apply a first transformation 166 to the initial datasets 162, 164, which can include joining the initial datasets 162, 164 (such as or similar to a SQL JOIN), and/or a filtering of the initial datasets 162, 164. The output of the first transformation 166 can include a modified dataset 168. A second transformation of the modified dataset 168 can result in an output dataset 170, such as a report or a joined table in a tabular data format that can be stored in the database 132. Database 132 may be referred to herein as an internal database because it stores the ingested data (e.g., derivative datasets) received from external data sources following the ingest process. However, in practice, database 132 does not need to be physically internal to the system. However, for the purposes of facilitating understanding that the database 132 is closely associated with the data retention and deletion system 150, this disclosure makes reference to an internal database and the derivative datasets being internally stored.

Each of the steps in the example data transformation process 158 can be recorded by the data retention and deletion system 150 and made available as a resource to the data retention and deletion system. For example, a resource can include a dataset and/or a dataset item, a transformation, or any other step in a data transformation process. As mentioned above, the data transformation process or build 158 can be triggered by the data retention and deletion system 150, where example triggers can include nightly build processes, detected events, or manual triggers by a user. Additional aspects of data transformations and the data retention and deletion system 150 are described in further detail below.

A version of dataset may correspond to a successfully committed transaction against the dataset. In these embodiments, a sequence of successfully committed transactions against the dataset corresponds to a sequence of dataset versions of the dataset (i.e., a sequence of dataset items of the dataset).

A transaction against a dataset may add data to the dataset, edit existing data in the dataset, remove existing data from the dataset, or a combination of adding, editing, or removing data. A transaction against a dataset may create a new version of the dataset (i.e., a new dataset item of the dataset) without deleting, removing, or modifying pre-existing dataset items (i.e., without deleting, removing, or modifying pre-existing dataset versions). A successfully committed transaction may correspond to a set of one or more files that contain the data of the dataset item created by the successful transaction. The set of files may be stored in a file system.

In the catalog, a dataset item of a dataset may be identified by the name or identifier of the dataset and the dataset version corresponding to the dataset item. In an embodiment, the dataset version corresponds an identifier assigned to the transaction that created the dataset version. The dataset item may be associated in the catalog with the set of files that contain the data of the dataset item. In an embodiment, the catalog treats the set of files as opaque. That is, the catalog itself may store paths or other identifiers of the set of files but may not otherwise open, read, or write to the files.

In sum, the catalog may store information about datasets. The information may include information identifying different versions (i.e., different dataset items) of the datasets. In association with information identifying a particular version (i.e., a particular dataset item) of a dataset, there may be information identifying one or more files that contain the data of the particular dataset version (i.e., the particular dataset item).

The catalog may store information representing a non-linear history of a dataset. Specifically, the history of a dataset may have different dataset branches. Branching may be used to allow one set of changes to a dataset to be made independent and concurrently of another set of changes to the dataset. The catalog may store branch names in association with dataset version identifiers for identifying dataset items that belong to a particular dataset branch.

The catalog may provide dataset provenance at the transaction level of granularity. As an example, suppose a transformation is executed in the data retention and deletion system 150 multiple times that reads data from dataset A, reads data from dataset B, transforms the data from dataset A and the data from dataset B in some way to produce dataset C. As mentioned, this transformation may be performed multiple times. Each transformation may be performed in the context of a transaction. For example, the transformation may be performed daily after datasets A and B are updated daily in the context of transactions. The result being multiple versions of dataset A, multiple versions of dataset B, and multiple versions of dataset C as a result of multiple executions of the transformation. The catalog may contain sufficient information to trace the provenance of any version of dataset C to the versions of datasets A and B from which the version of dataset C is derived. In addition, the catalog may contain sufficient information the trace the provenance of those versions of datasets A and B to the earlier versions of datasets A and B from which those versions of datasets A and B were derived.

The provenance tracking ability is the result of recording in the catalog for a transaction that creates a new dataset version, the transaction or transactions that the given transaction depends on (e.g., is derived from). The information recorded in the catalog may include an identifier of each dependent transaction and a branch name of the dataset that the dependent transaction was committed against.

According to some embodiments, provenance tracking extends beyond transaction level granularity to column level granularity. For example, suppose a dataset version A is structured as a table of two columns and a dataset version B is structured as a table of five columns. Further assume, column three of dataset version B is computed from column one of dataset version A. In this case, the catalog may store information reflecting the dependency of column three of dataset version B on column one of dataset version A.

The catalog may also support the notion of permission transitivity. For example, suppose the catalog records information for two transactions executed against a dataset referred to in this example as "Transaction 1" and "Transaction 2." Further suppose a third transaction is performed against the dataset which is referred to in this example as "Transaction 3." Transaction 3 may use data created by Transaction 1 and data created by Transaction 2 to create the dataset item of Transaction 3. After Transaction 3 is executed, it may be decided according to organizational policy that a particular user should not be allowed to access the data created by Transaction 2. In this case, as a result of the provenance tracking ability, and in particular because the catalog records the dependency of Transaction 3 on Transaction 2, if permission to access the data of Transaction 2 is revoked from the particular user, permission to access the data of Transaction 3 may be transitively revoked from the particular user.

The transitive effect of permission revocation (or permission grant) can apply to an arbitrary number of levels in the provenance tracking. For example, returning to the above example, permission may be transitively revoked for any transaction that depends directly or indirectly on the Transaction 3.

According to some embodiments, where provenance tracking in the catalog has column level granularity. Then permission transitivity may apply at the more fine-grained column level. In this case, permission may be revoked (or granted) on a particular column of a dataset and based on the column-level provenance tracking in the catalog, permission may be transitively revoked on all direct or indirect descendent columns of that column.

A build service can manage transformations which are executed in the system to transform data. The build service may leverage a directed acyclic graph data (DAG) structure to ensure that transformations are executed in proper dependency order. The graph can include a node representing an output dataset to be computed based on one or more input datasets each represented by a node in the graph with a directed edge between node(s) representing the input dataset (s) and the node representing the output dataset. The build service traverses the DAG in dataset dependency order so that the most upstream dependent datasets are computed first. The build service traverses the DAG from the most upstream dependent datasets toward the node representing the output dataset rebuilding datasets as necessary so that they are up-to-date. Finally, the target output dataset is built once all of the dependent datasets are up-to-date.

The data retention and deletion system 150 can support branching for both data and code. Build branches allow the same transformation code to be executed on multiple branches. For example, transformation code on the master branch can be executed to produce a dataset on the master branch or on another branch (e.g., the develop branch). Build branches also allow transformation code on a branch to be executed to produce datasets on that branch. For example, transformation code on a development branch can be executed to produce a dataset that is available only on the development branch. Build branches provide isolation of re-computation of graph data across different users and across different execution schedules of a data pipeline. To support branching, the catalog may store information represents a graph of dependencies as opposed to a linear dependency sequence.

The data retention and deletion system 150 may enable other data transformation systems to perform transformations. For example, suppose the system stores two "raw" datasets R1 and R2 that are both updated daily (e.g., with daily web log data for two web services). Each update creates a new version of the dataset and corresponds to a different transaction. The datasets are deemed raw in the sense that transformation code may not be executed by the data retention and deletion system 150 to produce the datasets. Further suppose there is a transformation A that computes a join between datasets R1 and R2. The join may be performed in a data transformation system such a SQL database system, for example. More generally, the techniques described herein are agnostic to the particular data transformation engine that is used. The data to be transformed and the transformation code to transform the data can be provided to the engine based on information stored in the catalog including where to store the output data.

According to some embodiments, the build service supports a push build. In a push build, rebuilds of all datasets that depend on an upstream dataset or an upstream transformation that has been updated are automatically determined based on information in the catalog and rebuilt. In this case, the build service may accept a target dataset or a target transformation as an input parameter to a push build command. The build service than determines all downstream datasets that need to be rebuilt, if any.

As an example, if the build service receives a push build command with dataset R1 as the target, then the build service would determine all downstream datasets that are not up-to-date with respect to dataset R1 and rebuild them. For example, if dataset D1 is out-of-date with respect to dataset R1, then dataset D1 is rebuilt based on the current versions of datasets R1 and R2 and the current version of transformation A. If dataset D1 is rebuilt because it is out-of-date, then dataset D2 will be rebuilt based on the up-to-date version of dataset D1 and the current version of transformation B and so on until all downstream dataset of the target dataset are rebuilt. The build service may perform similar rebuilding if the target of the push build command is a transformation.

The build service may also support triggers. In this case, a push build may be considered a special case of a trigger. A trigger, generally, is a rebuild action that is performed by the build service that is triggered by the creation of a new version of a dataset or a new version of a transformation in the system.

A schema metadata service can store schema information about files that correspond to transactions reflected in the catalog. An identifier of a given file identified in the catalog may be passed to the schema metadata service and the schema metadata service may return schema information for the file. The schema information may encompass data schema related information such as whether the data in the file is structured as a table, the names of the columns of the table, the data types of the columns, user descriptions of the columns, etc.

The schema information can be accessible via the schema metadata service may versioned separately from the data itself in the catalog. This allows the schemas to be updated separately from datasets and those updates to be tracked separately. For example, suppose a comma separated file is uploaded to the system as particular dataset version. The catalog may store in association with the particular dataset version identifiers of one or more files in which the CSV data is stored. The catalog may also store in association with each of those one or more file identifiers, schema information describing the format and type of data stored in the corresponding file. The schema information for a file may be retrievable via the scheme metadata service given an identifier of the file as input. Note that this versioning scheme in the catalog allows new schema information for a file to be associated with the file and accessible via the schema metadata service. For example, suppose after storing initial schema information for a file in which the CSV data is stored, updated the schema information is stored that reflects a new or better understanding of the CSV data stored in the file. The updated schema information may be retrieved from the schema metadata service for the file without having to create a new version of the CSV data or the file in which the CSV data is stored.

When a transformation is executed, the build service may encapsulate the complexities of the separate versioning of datasets and schema information. For example, suppose transformation A described above in a previous example that accepts the dataset R1 and dataset R2 as input is the target of a build command issued to the build service. In response to this build command, the build service may determine from the catalog the file or files in which the data of the current versions of datasets R1 and R2 is stored. The build service may then access the schema metadata service to obtain the current versions of the schema information for the file or files. The build service may then provide all of identifiers or paths to the file or files and the obtained schema information to the data transformation engine to execute the transformation A. The underlying data transformation engine interprets the schema information and applies it to the data in the file or files when executing the transformation A.

Figure 2:
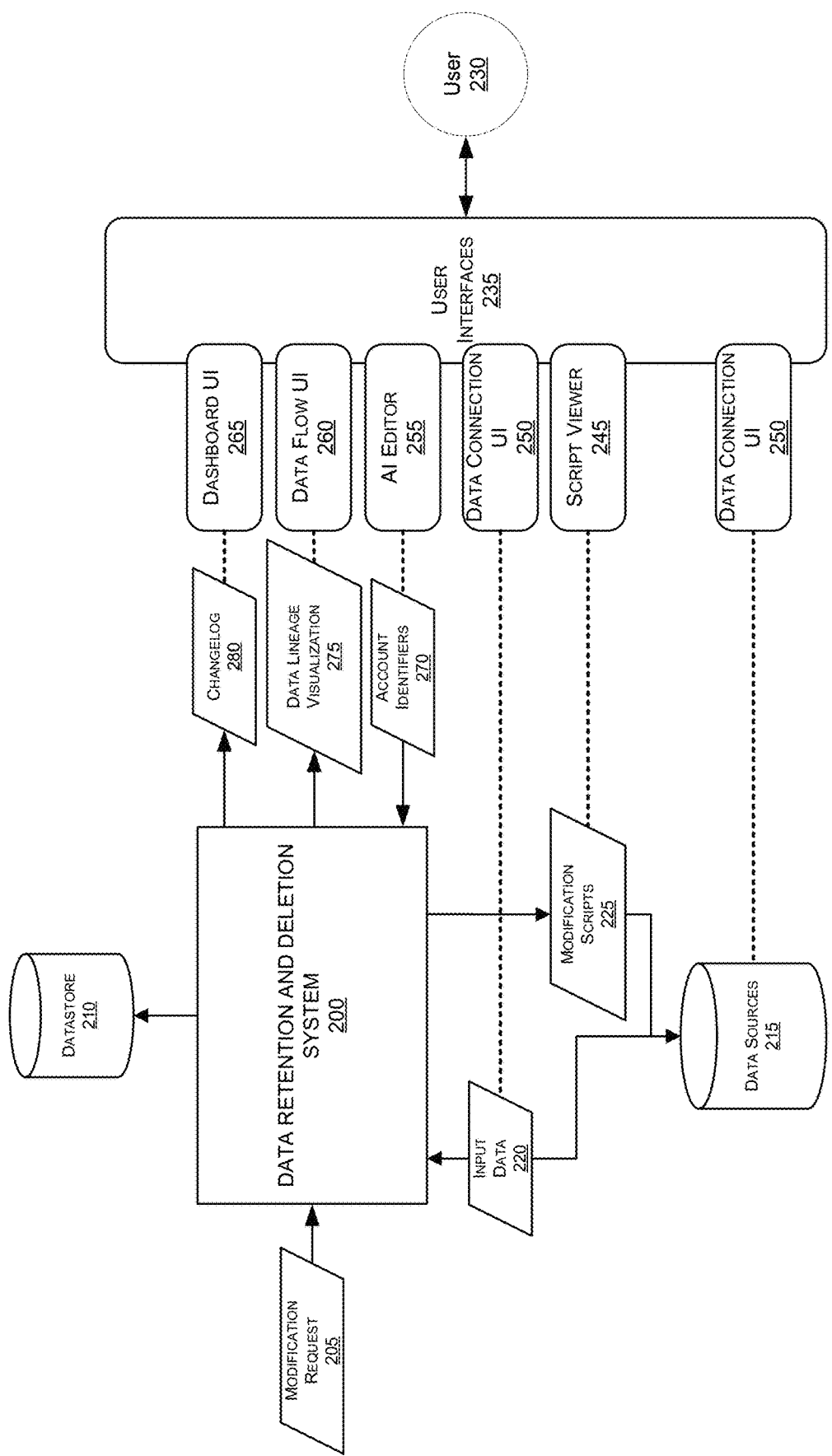
FIG. 2 is a system diagram detailing the interactions associated with the data retention and deletion system 200, according to some embodiments of the present disclosure.

FIG. 2 is a system diagram detailing the interactions associated with the data retention and deletion system 200, according to some embodiments of the present disclosure. The data retention and deletion system 200 may include a centralized decision engine and platform for processing data modification requests, with the capability of performing vertical and horizontal eligibility checks.

In some embodiments, the data retention and deletion system 200 may serve as an adaptable platform that can manage data from a variety of data sources by ingesting and storing copies of that data (e.g., derivative datasets) within an internal data store, thereby enabling that data to be used for processing workflows and collaboration within a single platform.

More specifically, the data retention and deletion system 200 may receive input data 220 from one or more data sources 215. The data retention and deletion system 200 may ingest the input data 220 (e.g., by performing a data transformation process, such as data transformation process 158 described in regard to FIG. 1) and store a copy of the ingested input data 220 in the data store 210. The data may be stored as derivative datasets within the data store 210. The data retention and deletion system 200 may continually or periodically ingest and store the input data 220 within the data store 210 to reflect changes in the data at the one or more data sources 215. Any new data may be added to a new version of a dataset within the data store 210.

Various aspects of the data retention and deletion system 200 may be configurable via various user interfaces 235, which may be operated by a user 230 (e.g., an administrator). The user interfaces 235 may enable human-driven oversight over the data retention and deletion system 200 as it processes a data modification (e.g., deletion) request. More specifically, the user interfaces 235 may provide visualizations to the user 230 for reviewing the data processing pipeline for processing a data modification request 205 and the proposed data modifications for complying with the request. The user interfaces 235 may provide controls the user 230 for initiating or triggering various steps or portions of the data processing pipeline to ensure that modifications do not take place without having undergone sufficient review, thereby preventing costly modification errors from being made.

The user interfaces 235 may primarily include a dashboard user interface 265 and a data flow user interface 260 for enabling the user 230 to orchestrate the data modification process. There may also be other standalone user interfaces, such as an account identifier editor 255, a data connection user interface 250, and a script viewer 245 that can be used for configuring various aspects of the data retention and deletion system 200. However, the functionality of those user interfaces may be incorporated into the dashboard user interface 265 and/or the data flow user interface 260 for convenience purposes. For instance, in some embodiments, the functionality of the account identifier editor 255 (e.g., providing a list of account identifiers) may be incorporated into the dashboard user interface 265 and the functionality of the script viewer 245 (e.g., viewing modification scripts) may be incorporated into the dashboard user interface 265 and/or the data flow user interface 260.

The data connection user interface 250 may be usable for viewing, adding, and editing the data sources 215, as well as selecting the relevant data tables at those data sources for ingestion. There may be numerous external data sources 215, which may be associated with one or more data controllers (e.g., in the event that the data retention and deletion system 200 is configured to process data modification requests on the behalf of multiple data controllers). The data connection user interface 250 may be usable for viewing and editing the input data 220 being ingested from the data sources 215 by allowing the user 230 to connect to, preview, and ingest data from external data sources 215. The user 230 may be able to use the data connection user interface 250 to manage the data extraction of tables that are relevant to retention by the data retention and deletion system 200. Once the relevant tables have been identified, syncs may be set up to ingest the data into the data retention and deletion system. The ingesting can be done in bulk or synced on a regular schedule.

The account identifier editor 255 may be usable for searching, viewing, and editing a list of account identifiers 270 associated with a data subject of the modification request 205, which the data retention and deletion system 200 may use in order to locate data for modification (e.g., by matching the account identifiers 270 to data in the data store 210). In some embodiments, the account identifier editor 255 may be part of the dashboard user interface 265.

Figure 4:
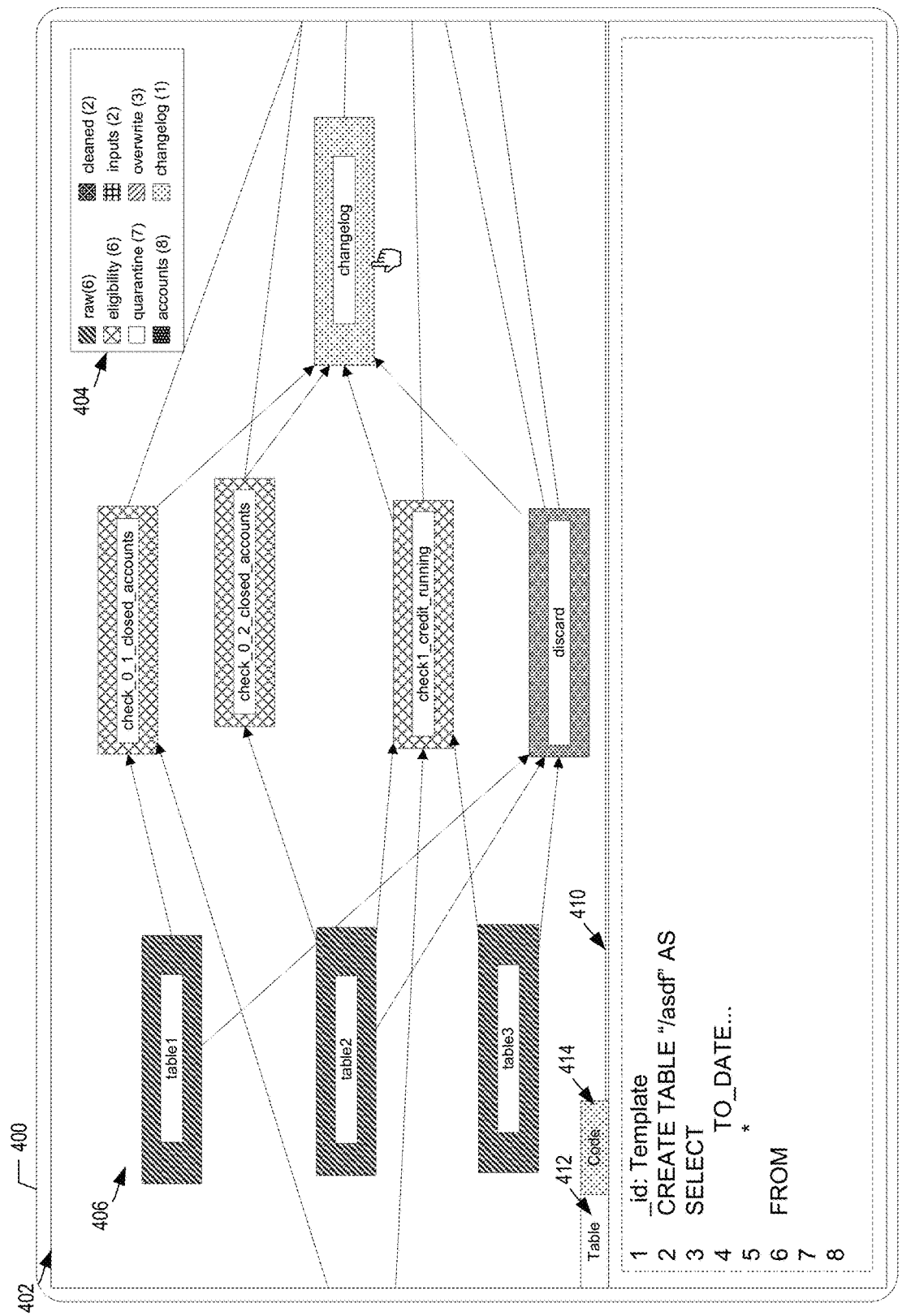
FIG. 4 illustrates an example user interface used to view data flow for a data retention and deletion system, according to some embodiments of the present disclosure.
Figure 5:
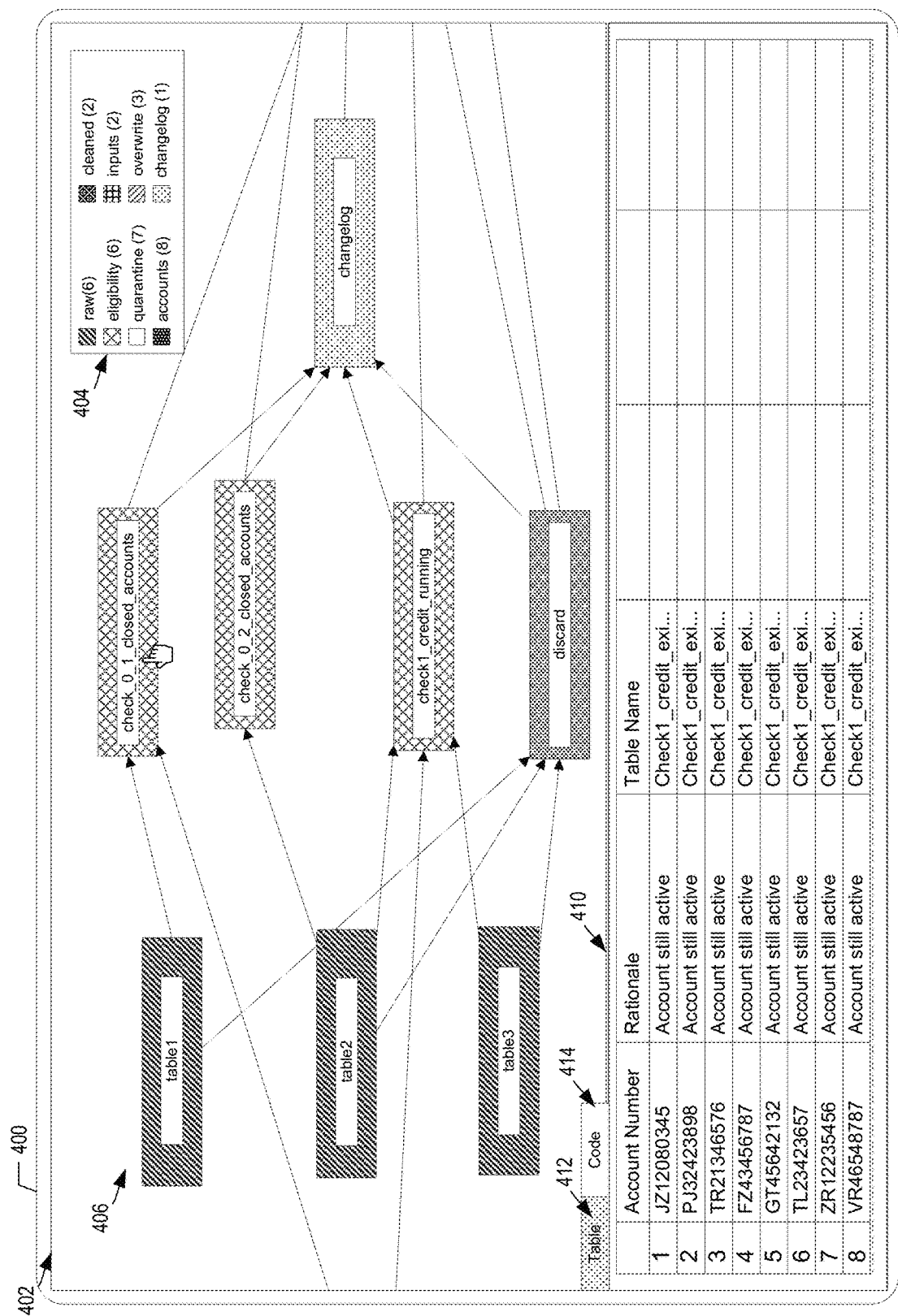
FIG. 5 illustrates an example user interface used to view data flow for a data retention and deletion system, according to some embodiments of the present disclosure.

The data flow user interface 260 may be usable for viewing a data lineage visualization 275 generated by the data retention and deletion system 200 that provides details on how data is processed throughout the data processing pipeline for the modification request. An example of a data flow user interface is shown in FIGS. 4 and 5.

The dashboard user interface 265 may be usable for viewing and editing a changelog 280 that contains the proposed data modifications for complying with the modification request. The script viewer 245 may be usable for viewing and editing the modification scripts 225 that are generated by the data retention and deletion system 200 to execute the proposed data modifications at the data sources 215. In various other embodiments, the functionality of the script viewer 245 may be in the data flow user interface 260, the dashboard user interface 265, or both. Using the dashboard user interface 265 and or the script viewer 245, the user 230 may be able to review the proposed data modifications and the modification scripts 225 for carrying out those modifications. If everything is satisfactory, the user 230 may be able to also trigger execution of the modifications via the dashboard user interface 265 and the modification scripts 225 will be pushed out to the data sources 215.

The data retention and deletion system 200 may also have additional user interfaces that are not shown in the figures. For instance, there may be a user interface that enables users and data owners to centralize comments and flag data issues that are transparent to everyone viewing the data. There may be a user interface that enables users to set checks on datasets to generate an alert whenever the data changes as a result of executing the data processing pipeline. For instance, data health alerts can be set up to flag when previously reviewed account identifiers become eligible and need to be deleted. These alerts enable administrators to be proactive without having to conduct manual checks every time. There may be a user interface for presenting the history of job build details, so users can understand important details such as when a job was triggered, the status, how long it took, and when it was last updated.

Figure 3:
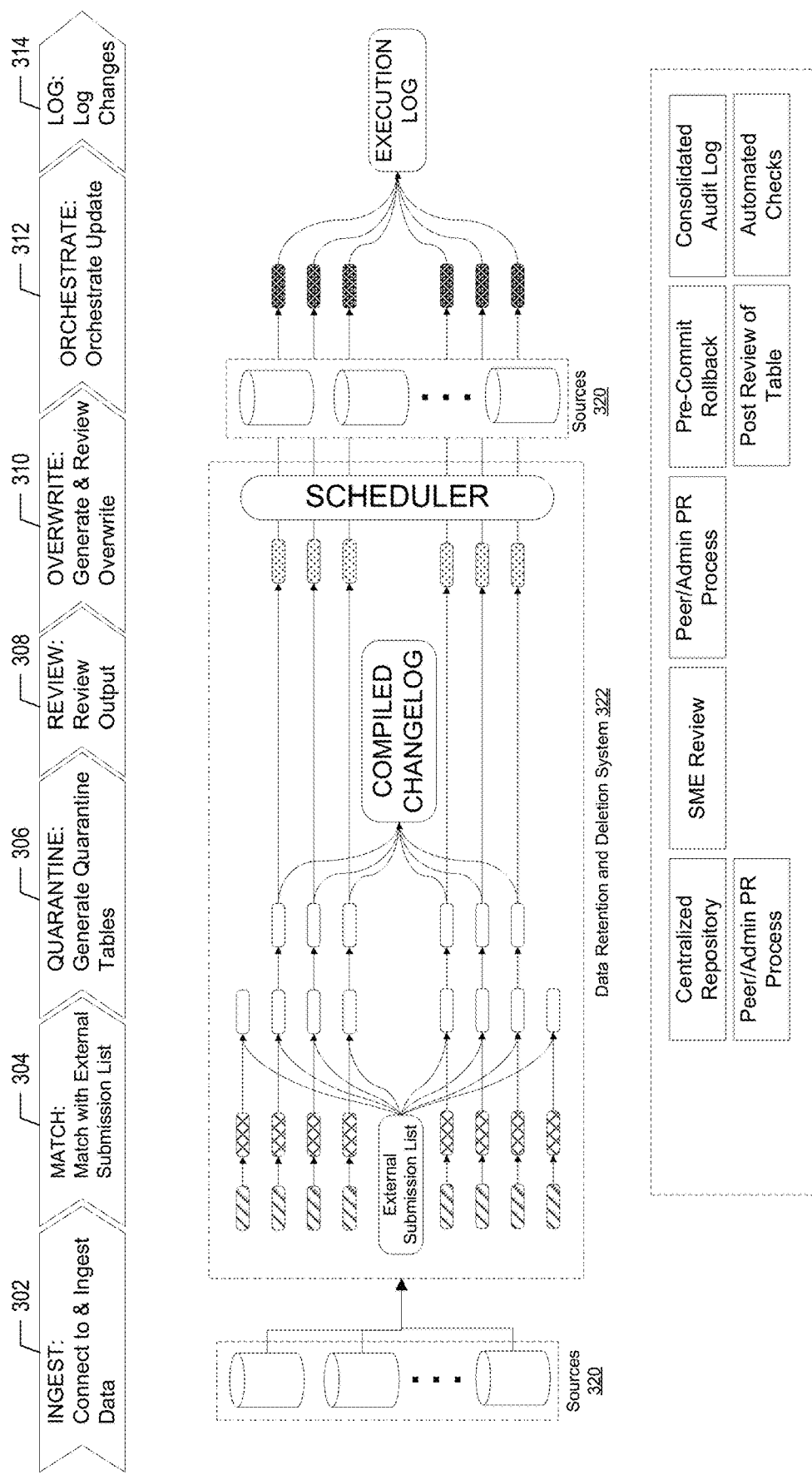
FIG. 3 is a flow diagram illustrating some operations performed by a data retention and deletion system, according to some embodiments of the present disclosure.

FIG. 3 is a flow diagram illustrating operation of an example data retention and deletion system, according to embodiments of the present disclosure.

Blocks 302, 304, 306, 308, 310, 312, and 314 at the top of FIG. 3 illustrate some of the operations performed by the data retention and deletion system 322 for processing a data modification (e.g., deletion) request.

For instance, at block 302, the data retention and deletion system 322 connects to a set of data sources 320 and ingests the data from the sources 320. More specifically, the data retention and deletion system 322 may ingest (e.g., receive and integrate) data from the numerous external data sources that store data associated with subjects (e.g., individuals).

The data retention and deletion system 322 may transform, copy, and store that data internally (e.g., in an internal data store) to make it easier and more efficient to determine the data to be deleted (e.g., at the external data sources) during the processing of a deletion request. This process may be performed periodically or synced with changes made at the set of data sources 320 to keep the internal copy of the data (e.g., in the internal data store) up-to-date. The data retention and deletion system 322 may be configurable (e.g., via a user interface, such as the data connection user interface described herein) to set up connections and permissions with the sources 320, and to create syncs for key datasets stored across the sources 320.

At block 304, the data retention and deletion system 322 may receive a data modification (e.g., deletion) request associated with a subject. Upon receiving a data modification request, a legal and compliance check may be conducted to ensure that modification is eligible for the subject. This may be performed automatically by the data retention and deletion system 322, but in some cases, this may be performed by an internal team (e.g., a legal team, a data correction officer, and so forth). These checks may involve determining that the request was submitted by a real person whose identity is confirmed and that the request was submitted by a person that has account information within the internally stored data of the data retention and deletion system 322.

After the checks, the data retention and deletion system 322 may determine a list of search terms associated with the identity of the subject, which may include any information related to the data subject, such as account identifiers, unique identifiers (e.g., social security numbers), and so forth. For the purpose of facilitating understanding of the data retention and deletion system 322, an example of using account identifiers for the search terms is discussed, in which the data retention and deletion system 322 may determine a list of account identifiers associated with the subject and eligible for deletion. This can be done in a number of ways. For instance, the list of account identifiers may be provided directly to the data retention and deletion system 322 via a form in a user interface. The data retention and deletion system 322 may also have an internal list or table of account identifiers mapped to various subjects, which may be used to lookup the account identifiers associated with a confirmed subject. The list of account identifiers associated with the subject can then be compared to a list of account identifiers which are eligible for modification (e.g., the External Submission List) in order to generate a final list of relevant account identifiers that are valid for the modification request.

If applicable, the data retention and deletion system 322 may also perform additional eligibility checks on this list of relevant account identifiers that are valid for the modification request, including a series of checks related to accounts (e.g., retention period, closed status, and so forth). This may further narrow down the list of relevant account identifiers that are valid for the modification request.

At block 306, the data retention and deletion system 322 may use the list of relevant account identifiers for the subject that are valid for the modification request in order to generate quarantine tables. More specifically, the data retention and deletion system 322 may look at the datasets in the internal copy of data (e.g., the data ingested and integrated from the sources 320) and determine all the relevant tables within the datasets that are associated with those account identifiers in the list. Put another way, the data retention and deletion system 322 may track and manage quarantined data by matching account identifiers in the list against the tables of the datasets in the internal copy of data in order to determine the data items that need to be modified and the modifications to perform. For instance, the data retention and deletion system 322 may generate impacted (rows to be deleted) and quarantined (tables with data to be deleted) datasets. The data retention and deletion system 322 may hold quarantined tables and impacted data for 30 days for review or reversal, if necessary.

In order to generate the quarantine tables, the data retention and deletion system 322 may determine data table mappings (e.g., table relations, column names) throughout the data and the necessary logic (e.g., deletion/anonymization logic) required for the modifications. There may be pre-configured modification logic in the data retention and deletion system 322 that can be applied without needing additional configuration from the user. This modification logic may be based on the details associated with the data modification request. For instance, there may be different modification logic associated with different countries (e.g., in order to comply with data privacy regulations of different countries), and particular modification logic may be selected by the data retention and deletion system 322 based on the identity of the data subject and/or the data controller storing the data associated with the subject. In some cases, users (and/or data owners associated with the sources 320) may be expected to map out data across the sources 320, as well as construct these logic and verification rules, and provide that information to the data retention and deletion system 322.

At block 308, the data retention and deletion system 322 may generate and compile various reports or visualizations, including a changelog, that enable a user (e.g., an administrator) to review the proposed modifications being made. These reports may be viewed by the user through one or more user interfaces, such as the dashboard user interface described herein. The user may review the reports and then trigger the modification themselves, or there may be a central operator (e.g., central administrator) that is able to trigger modifications associated with numerous modification requests. There may be other user interfaces as well which allow the user to share and collaborate the reports with other users to review the proposed modifications and get sign-off for approval. Some of these user interfaces may track the state of the collaborative review process.

At block 310, the data retention and deletion system 322 may generate source writeback code or scripts for performing modification of the copy of the data stored at the sources 320 (e.g., the external data sources). This code may be generated based off the determined data table mappings (e.g., table relations, column names) throughout the data and the necessary modification logic (e.g., deletion/anonymization logic) required for the modifications. In some cases, in addition to evaluating the quarantined data and triggering the modifications, users (and/or data owners associated with sources 320) may be expected to write out the modification scripts.

At block 312, once the user has reviewed the proposed modifications and triggered them to take place, the data retention and deletion system 322 may orchestrate the update of the data at the sources 320 and push out those scripts to the sources 320 to have the writeback of the data on the sources 320 performed. In some cases, due to data dependencies, deletions may actually require cascading deletes across multiple tables of the sources 320 or need to be scheduled in coordination with source system processes. The data retention and deletion system 322 may be configured to handle data connections that include SQL Server, DB2, IBM IMS DLI, Oracle, NAS, SharePoint, MySQL, and IBM Content Manager. The data retention and deletion system 322 may also make the corresponding changes to the internally stored copies of the data.

Since modification of the data at the sources 320 is more permanent than modification of the internal copy of the data, in order to prevent modification by error or mistake, the data retention and deletion system 322 may have features for manual and automated checks in place as safeguards. These checks may include the collection of logic (e.g., the main logic for determining the data items to modify and the modifications to perform) into a centralized repository, which makes it easier to review all logic entries at once, find inconsistencies, and fix items as needed. This may also minimize replication of the same logic or code. The checks may also include a Peer/Admin PR process, such that all pipeline logic for eligibility checks, quarantine/overwrites, and modification (e.g., deletion) code may require a PR process, through which most users may only be able to write and modify the modification code on branches. There may be a central user (e.g., a central administrator) that checks for accuracy, consistency, and code quality in the modification code. The checks may also include a series of automated CI/code checks that run regularly to ensure no duplicated code across the central repository storing the logic (which may happen given the scale of tables) to setting up general tests.

The checks may also include reports review, such that after modification code has been generated and the impacted account identifiers and tables have been determined, users have the opportunity to review the exact changes being made to the databases. The checks may also include pre-commit rollback, such that in the event that a sequence of modifications (e.g., deletions or anonymizations) fail, the data retention and deletion system 322 is able to undo the modifications that were made. The checks may also include post-modification review (e.g., via a user interface) that enables a user to view a snapshot of the data at the sources 320 following modification in order to ensure that the modification was completed and performed correctly. The sources 320 may also provide confirmation back to the data retention and deletion system 322 once modifications have been completed. The checks may also include auto-checks, such that each processing pipeline (e.g., for handling a modification request) come with a series of data health checks that are either auto-generated with CI jobs or manually created to ensure that data that is modified, stays modified, and builds are completed successfully.

At block 314, the data retention and deletion system 322 may log the data modifications into an execution log. This execution log may be useful for additional oversight and to ensure that the proper modifications were made to the data at the sources 320.

Thus, as shown in FIG. 3, the data retention and deletion system 322 can be used to process modification requests while also providing numerous features that facilitate proper oversight of the entire workflow. The data retention and deletion system 322 may be designed to provide users with data oversight, a global view of orchestration with audited change, and code checks and reviews of outputs at each possible step. The data retention and deletion system 322 may utilize a centralized repository to minimize replication of code (e.g., modification logic) and the code itself may be generated from templates using scripts to minimize manual editing.

FIGS. 4 and 5 illustrate example user interfaces used to view data flow for a data retention and deletion system, according to some embodiments of the present disclosure. More specifically, FIGS. 4 and 5 show a data flow user interface 400 associated with embodiments of the data retention and deletion system described herein.

The data flow user interface 400 may include a visualization 402 portion that may include an index 404 and a lineage 406. The lineage 406 shown in the visualization 402 may provide the user a "mapping" or view of how data flows within the context of the processing pipeline associated with the modification request. This lineage 406 may have labeled boxes associated with some of the steps in the processing pipeline and there may be lines or arrows drawn between labeled boxes to illustrate how data flows over the course of the processing pipeline. Boxes associated with different steps or parts of the processing pipeline may be colored, shaded, or patterned differently, and the index 404 may provide additional context regarding what the differences in color, shading, or patterning represent. For instance, the example index 404 shows the patterning distinctions between raw data, eligibility checks, quarantined data, account identifiers, cleaned data, inputs, overwrites (e.g., modifications to the data at the sources), and a changelog.

Below the visualization 402 is a panel 410 that provides additional information for the selected labeled box in the lineage 406. For instance, selecting the "check_0_1_closed_accounts" box with the cursor will pull up additional information associated with that portion of the processing pipeline within the panel 410. To select what information is shown in the panel 410, there may be a set of tabs, such as the table tab 412 and the code tab 414 shown. With the code tab 414 selected, as in FIG. 4, the panel 410 shows the code associated with the selected box of the lineage 406 and the corresponding portion of the processing pipeline. For example, if the selected box is associated with quarantining and deleting data from a particular table, the panel 410 may show the code for performing the modification on the table or a template for code that can be modified as desired (e.g., manually by a user) in order to perform the modification.

With the table tab 412 selected, as in FIG. 5, the panel 410 shows the data associated with the selected box of the lineage 406 and the corresponding portion of the processing pipeline. For example, if the selected box is associated with quarantining and deleting data from a particular table, the panel 410 may show the modifications to the data items in the table. Or if the selected box is associated with eligibility checks performed on a list of account identifiers, the panel 410 may show a table with each of the account identifiers, the eligibility check(s) applied to account identifiers, the rationale associated with the eligibility check(s), and so forth.

Thus, the combination of the visualization 402 and the additional information provided in the panel 410 of the data flow user interface 400 may provide the user a flexible way of viewing data within the context of the data processing pipeline, as well as allow the user to understand how data is brought into the pipeline; to view the logic and rules applied in the code associated with the processing pipeline; and preview data for quality assurance, review, and iteration.

Figure 6:
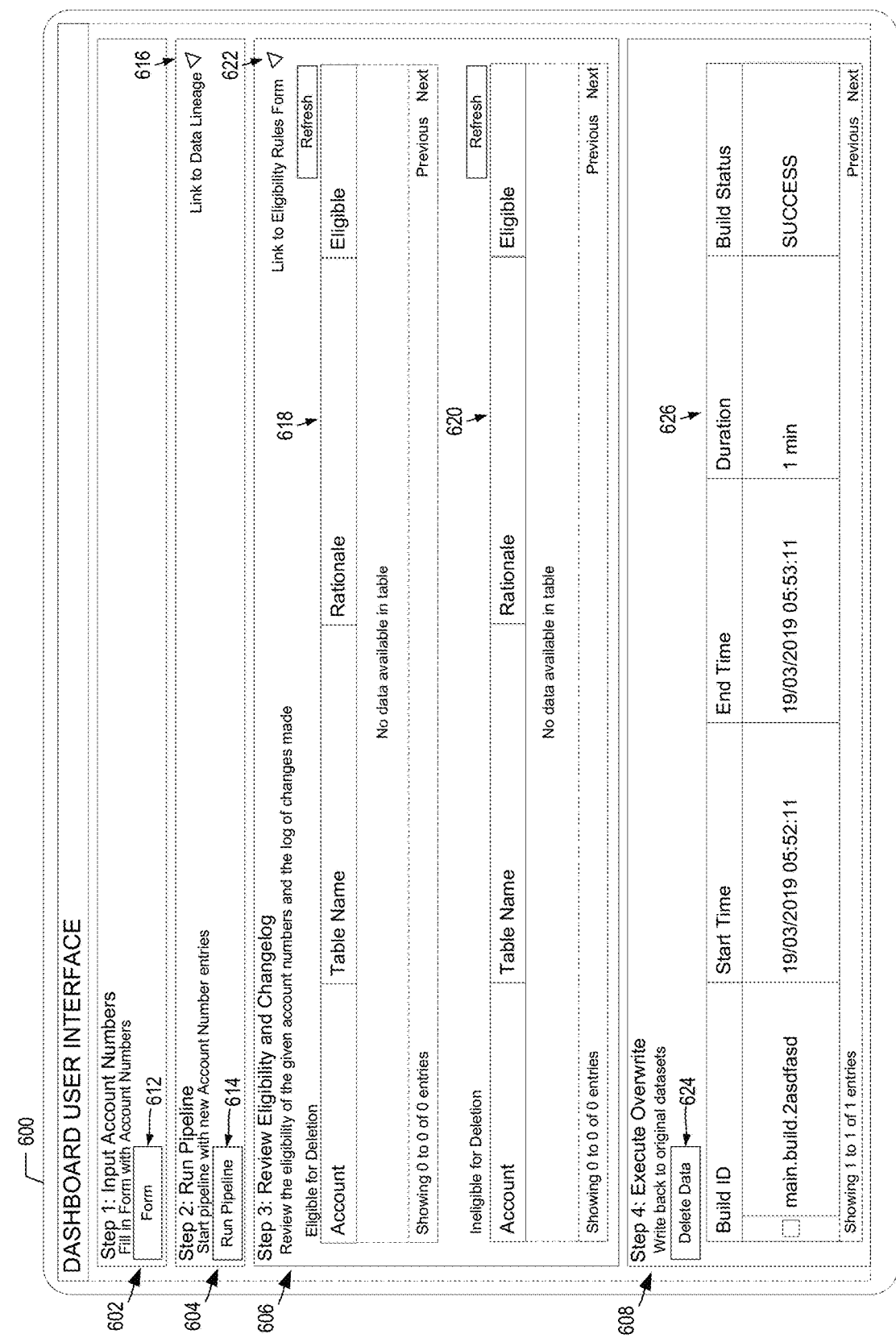
FIG. 6 illustrates an example user interface used to configure various aspects of operations performed by a data retention and deletion system, according to some embodiments of the present disclosure.

FIG. 6 illustrates an example user interface used to configure various aspects of operations performed by a data retention and deletion system, according to some embodiments of the present disclosure. More specifically, FIG. 6 shows a dashboard user interface 600 associated with embodiments of the data retention and deletion system described herein.

The dashboard user interface 600 may include a section 602 associated with inputting a list of search terms associated with the identity of the subject, such as account numbers associated with the subject. The data retention and deletion system may later perform eligibility checks on this list of account numbers to determine a list of account identifiers that are eligible for modification. There may be an input form that allows a user to input this list of account numbers. In the figure, this form may be accessed by selecting the form button 612. In some other embodiments, the data retention and deletion system may obtain the account identifiers from a separate source and would not require the user to manually enter the list of account identifiers through a user interface.

The dashboard user interface 600 may include a section 604 associated with running the processing pipeline for the modification request. There may be a run pipeline button 614 that the user may select to execute the processing pipeline. Once the processing pipeline is executed, the data retention and deletion system may perform eligibility checks on the list of account numbers to determine a list of account identifiers that are eligible for modification (e.g., deletion) and a list of account identifiers that are ineligible for modification (e.g., deletion). The data retention and deletion system may then determine the appropriate data items (e.g., in the internally stored copy of data and the corresponding copy in the external data sources) associated with those eligible account identifiers that should be modified based on modification logic. The dashboard user interface 600 may include a link 616 to a visualization for viewing the data lineage (including data flow, data dependencies, and data modifications) associated with the processing pipeline, such as through the data flow user interface shown in FIGS. 4-5.

The dashboard user interface 600 may include a section 606 that provides the user the ability to review the results of the eligibility checks (e.g., the eligibility of the provided account identifiers) and the changelog associated with the proposed modifications. The eligibility results may provide details on the relevant checks and rationales applied to the account identifiers for easy reference and inspection. For instance, there may be a table 618 that provides a list of the eligible account identifiers and their associated information, as well as a table 620 that provides a list of the ineligible account identifiers and their associated information. The user may be able to check the eligibility rules that were applied to the account identifiers to determine their eligibility via a link 622.

The dashboard user interface 600 may include a section 608 that provides the user the ability to execute the overwrite and modification of the original datasets held at the external data sources. There may be a delete data button 624 that allows the user to trigger the modification so that the code may be generated for modifying the data at the external data sources and pushed out to the external data sources. There may also be a table 626 that presents additional information associated with the various builds of those datasets (e.g., to track modifications applied to the data over time). In some embodiments, triggering the modifications to the external data sources may also trigger the same modifications to be performed in the corresponding internally-stored datasets.

Figure 7:
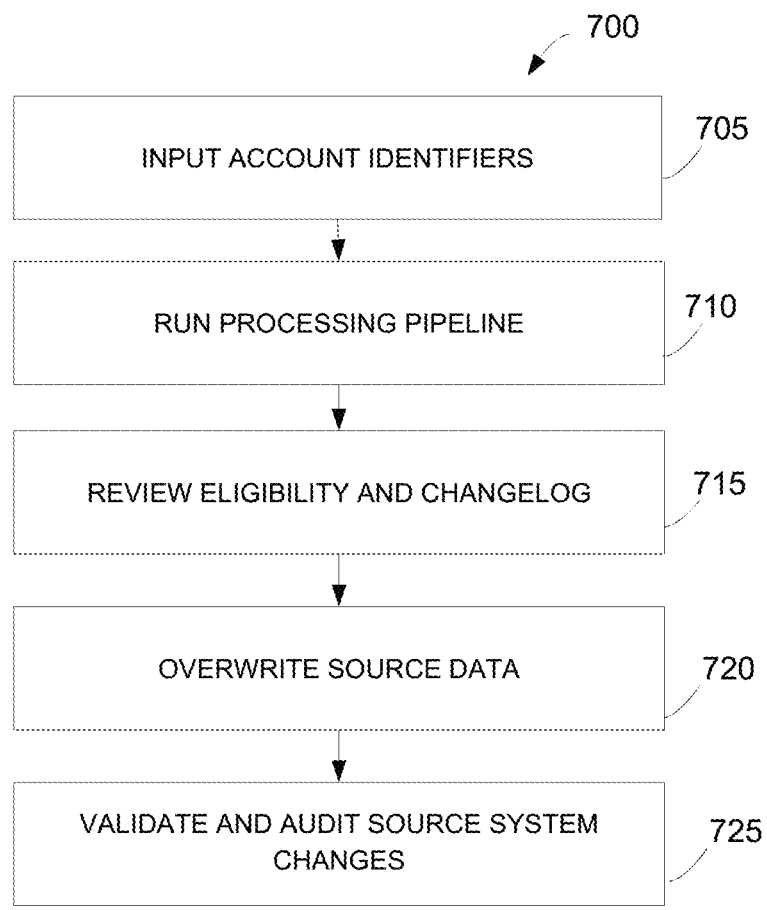
FIG. 7 illustrates a flow diagram illustrating some operations performed by a data retention and deletion system, according to some embodiments of the present disclosure.

FIG. 7 is a flow diagram illustrating some operations performed by a data retention and deletion system, according to some embodiments of the present disclosure.

Figure 8:
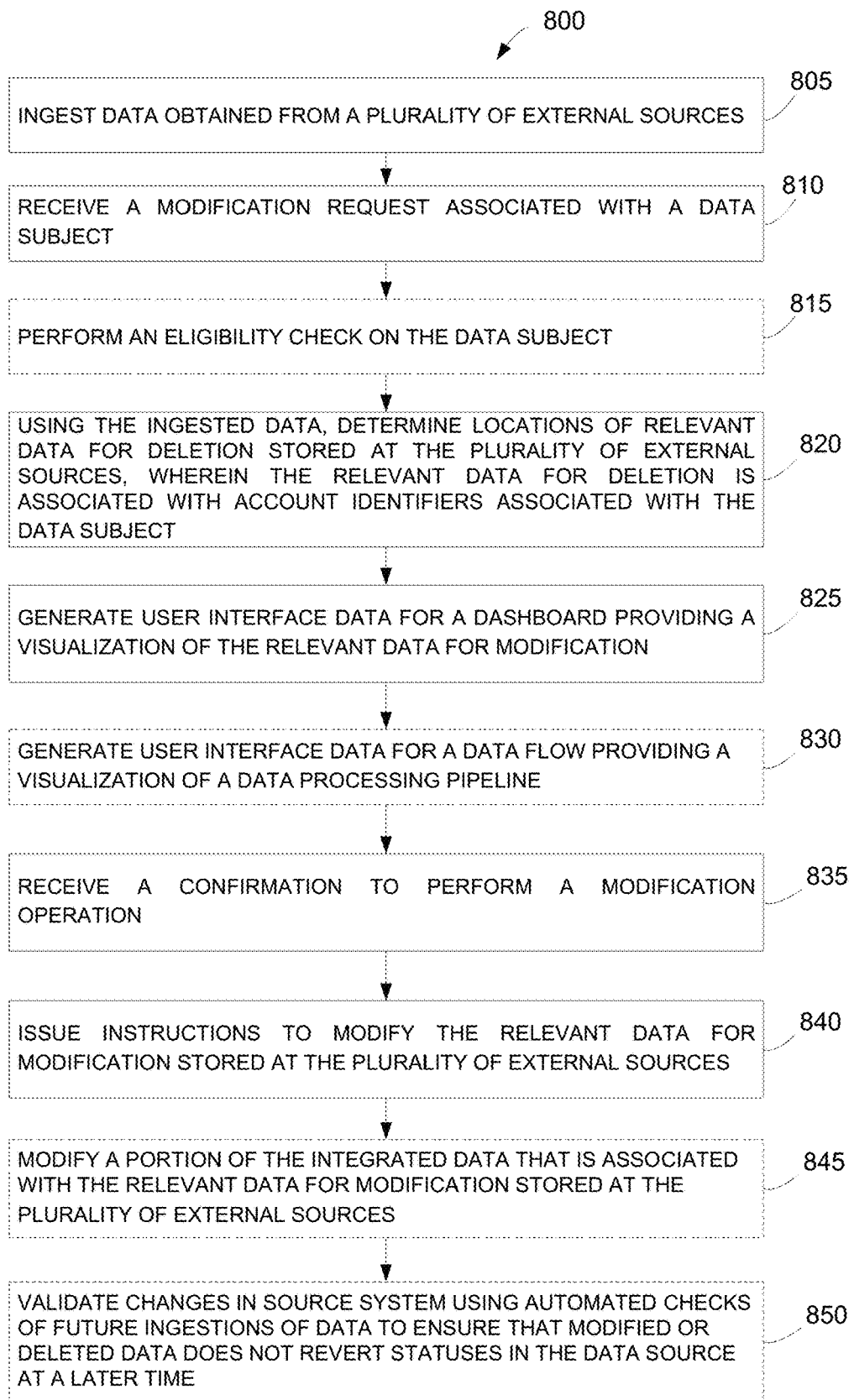
FIG. 8 is a flow diagram illustrating some operations performed by a data retention and deletion system, according to some embodiments of the present disclosure.

More specifically, the flow diagram 700 describes four general steps performed by the data retention and deletion system (a more detailed breakdown of steps is provided in FIG. 8). These four general steps include: (1) input account identifiers (or other search terms for identifying data associated with the subject), at block 705; (2) run processing pipeline, at block 710; (3) review eligibility and changelog, at block 715; and (4) overwrite source data, at block 720.

At block 705, in order to provide the data retention and deletion system a list of account identifiers (e.g., associated with the subject submitting a modification request), a user may input a list of account identifiers. The list of account identifiers may be configured and submitted through a user interface that includes a form field for entering the list of account identifiers, such as the dashboard user interface shown in FIG. 6.

At block 710, the data retention and deletion system may execute and run a data processing pipeline using the submitted list of account identifiers. The data retention and deletion system may compute account identifier eligibility for modification (e.g., by performing an eligibility check on each account identifier, referencing a list of eligible account identifiers, and/or applying a set of eligibility rules to each account identifier) and create quarantined datasets for review. The data retention and deletion system may also be able to keep track of the progress of the data processing pipeline and report that progress visually to the user (e.g., through a user interface, not shown in the figures).

As part of executing the processing pipeline, the data retention and deletion system may also be able to generate a data flow user interface for presenting a visualization of the data lineage (e.g., data flow and dependencies) associated with the data processing pipeline. The data flow user interface may be able to use the logic associated with the data processing pipeline for determining and presenting the data lineage, thereby allowing a user to account for every step of the pipeline logic. An example of this data flow user interface is provided in FIGS. 4 and 5. The data flow user interface may provide the user a flexible way of viewing data within the context of the data processing pipeline. This may allow the user to understand how data is brought into the pipeline; to view the logic and rules applied in the code associated with the processing pipeline; and preview data for quality assurance, review, and iteration.

At block 715, the data retention and deletion system may generate eligibility results and a changelog for a user to review. More specifically, the eligibility results associated with eligibility checks may be compiled into discarded and deleted account identifier datasets. These datasets may provide details on the relevant checks and rationales applied to the account identifiers for easy reference and inspection. A dashboard user interface (such as the dashboard user interface shown in FIG. 6) may provide the user with the relevant checks and rationales for the account identifiers via a table (e.g., tables 618 and 620 in FIG. 6), which may include an identifier of the account, a rationale, a determination regarding whether the account identifier is eligible or not eligible (e.g., for modification), a result, and/or a table name.

A changelog (e.g., describing proposed modifications to the data, as well as before/after datasets) may be compiled based on all the determined modifications to the data associated with the eligible account identifiers of the deletion request, with the determinations made based on the modification logic implemented by the system. Although this changelog is not shown in the dashboard user interface in FIG. 6, the changelog containing the data being quarantined or impacted may be linked and presented in the dashboard user interface, for further inspection and review of the proposed modifications to the data. Furthermore, the dashboard user interface may provide different users the ability to collaborate. The impacted data, along with before/after datasets, may be shared with other users.

At block 720, once the appropriate user(s) have reviewed the quarantined and impacted data and the before/after datasets, the dashboard user interface may provide options for modifying data (e.g., deletion, overwrite) on the external data sources. The data retention and deletion system may generate the appropriate scripts to be pushed out to the external data sources to perform the modification at the sources. Due to data dependencies, the deletion and overwriting of data may have to be updated in a certain order. That order can be viewed in the data flow user interface (e.g., via the data lineage), such as the ones shown in FIGS. 4 and 5. Upon review of the data dependencies (e.g., the dependent tables that have to be updated in a certain order), the modification of source data (e.g., via deletion or overwrite) can be triggered through the dashboard user interface, such as the button 624 in FIG. 6. The data modifications and updates will then propagate to the external data source(s). For example, the data retention and deletion system may generate a Structured Query Language (SQL) statement that gets pushed to the external data source(s).

At block 725, the data retention and deletion system can automatically track whether future snapshots of the data accurately reflect the previous changes and modifications made in the data. With each new ingestion, automated checks can run on this data to determine whether or not any changes were reverted. If so, the system will alert the user for further review and action.

FIG. 8 is a flow diagram illustrating some operations performed by a data retention and deletion system, according to some embodiments of the present disclosure. More specifically, the flow diagram 800 illustrates aspects of the data retention and deletion system associated with the data processing pipeline.

At block 805, the data retention and deletion system may ingest (e.g., receive, transform, and store) datasets from a plurality of external sources. The data retention and deletion system may store that ingested copy of data internally (e.g., in an internal data store). The ingested data may be stored as derivative datasets. The derivative datasets may include or be associated with metadata that indicate the corresponding dataset of the external source that the derivative dataset originated from. This allows the data retention and deletion system to use the internally stored derivative datasets for processing data modification requests, making it faster and more efficient for the data retention and deletion system to identify and determine the relevant data to be modified and the necessary modifications that should be applied. The data retention and deletion system can then make the corresponding modifications in the datasets at the external sources by using the metadata associated with the relevant data in the derivative datasets to determine the corresponding data at the external sources from which the relevant data in the derivative datasets originated from. The ingestion of data from external sources may be performed periodically and cumulatively stored. The ingestion can also be performed through the use of data snapshots, and as the data retention and deletion system obtains updated data it may also continue to keep older versions of derivative datasets.

At block 810, the data retention and deletion system may receive a modification request associated with a data subject (e.g., an individual). For instance, this could be a right-to-be-forgotten (RTBF) request to have some or all of the data associated with the subject stored at the external sources deleted. This modification request may be received from any source, including directly from the data subject, the data controller(s) associated with the external sources storing the subject's data, a user (e.g., administrator) of the data retention and deletion system, and so forth. In the latter case, where the modification request is initiated by the user of the data retention and deletion system, there may be a user interface (e.g., the dashboard user interface) through which the user may submit the modification request.

At block 815, if applicable, the data retention and deletion system may perform an eligibility check on the data subject associated with the modification request. The data retention and deletion system may confirm the identity of the data subject and their eligibility for requesting data modification. More specifically, the data retention and deletion system may look to determine that the request was submitted by a real person whose identity is confirmed and that the request was submitted by a person that has account information within the internally stored data of the data retention and deletion system. If the data retention and deletion system does not have enough information on hand to make a determination, an internal team associated with the data retention and deletion system (e.g., a legal team, a data correction officer, and so forth) may be requested to manually perform the check. The eligibility check may also include logic to determine whether or not the data can be deleted, e.g., if the data needs to be retained based on specific legal or regulatory retention policies and/or needs to be retained due to necessity of a business function.

At block 820, the data retention and deletion system may use the ingested data to determine locations of relevant data for modification stored at the plurality of external sources, with the relevant data for modification being associated with account identifiers of the data subject. More generally, the relevant data will be associated with a search terms associated with the identity of the subject, which may include any information associated with the data subject, such as account identifiers, unique identifiers (e.g., social security numbers), and so forth. These search terms can generally be handled by the data retention and deletion system in the same way (e.g., any discussion herein associated with account identifiers can be applied to a social security number, and so forth). In the instance where the search terms are account identifiers, the data retention and deletion system will determine a list of account identifiers that are associated with the data subject. There may be a database within the data retention and deletion system that lists the account identifiers for the data subject or the list of account identifiers may be provided to the data retention and deletion system, such as through a form of a user interface (e.g., the dashboard user interface described herein). If applicable, eligibility checks may also be performed on the account identifiers for the data subject to determine an eligible list of account identifiers for modification. In either case, the relevant list of account identifiers may be used as search terms to identify the datasets in the internally-stored, ingested data that are associated with the account identifiers. The metadata associated with those datasets will reveal where the corresponding relevant data is stored at the external sources, from which those datasets originated from during the ingestion process. Thus, the data retention and deletion system will have used the metadata associated with the ingested data to determine the locations of the relevant data for modification stored at the plurality of external sources.

At block 825, the data retention and deletion system may generate user interface data for a dashboard providing a visualization of the relevant data for modification (this visualization is not shown in the example dashboard user interface 600 shown in FIG. 6). The dashboard may provide the user with a visualization (e.g., in the form of tables) of the identified relevant data (e.g., at the external sources and/or the internally stored data) for modification and the proposed modifications that the data retention and deletion system has determined based on the modification logic. Furthermore, the dashboard may also provide the user with a visualization (e.g., in the form of tables) of the before-modification and after-modification versions of the relevant datasets, such that the user can determine if the proposed data modifications will result in an erroneous after-modification dataset. For instance, if the proposed modification is to anonymize and overwrite certain rows of a table, the user will be able to see the before and after results for the table. These features may provide the user the necessary oversight to reduce modification errors when orchestrating the data modification or deletion that the data retention and deletion system performs to process the received data modification request.

At block 830, if applicable, the data retention and deletion system may generate user interface data for a data flow providing a visualization of a data processing pipeline. An example of a data flow user interface is shown in FIGS. 4 and 5, which provides a data lineage that details how data flows and gets processed throughout the data processing pipeline. The data flow may not only provide the user of an understanding of the overall data processing pipeline, but also relevant details associated with each step of the processing pipeline. This may include, but is not limited to, the list of account identifiers provided, the list of account identifiers discarded or determined to be ineligible for modification, the list of account identifiers eligible for modification, the eligibility check(s) applied to the data subject or the account identifiers, the outcome and rationale associated with the eligibility check(s), the relevant datasets for the account identifiers that is stored internally or at the external sources, the proposed modifications to the relevant datasets, the before/after modification versions of the relevant datasets, the data dependencies between the relevant datasets, the ordering that the proposed modifications are to be performed due to the data dependencies across the relevant datasets, and so forth.

At block 835, the data retention and deletion system may receive a confirmation to perform the modification operation. This confirmation can be received based on an input from a user (e.g., via a user interface). For example, the example dashboard user interface in FIG. 6 has a button 624 that triggers the modification. This allows the user to execute the modification only upon thorough review (e.g., of the eligibility checks, changelog, and so forth) to ensure that the modifications are compliant with the data modification request and will not create any errors in the resulting datasets (e.g., there are no modification errors that break existing data dependencies).

At block 840, the data retention and deletion system may then issue instructions to modify the relevant data for modification stored at the plurality of external sources. Previously, at block 820, the data retention and deletion system already determined the relevant data for modification stored at the plurality of external sources based on the metadata associated with the ingested data. Thus, the data retention and deletion system will know the locations of the data items for modification (e.g., in which datasets, stored at which of the external sources) and will be able to generate and issue code or scripts for each of the external sources instructing each respective external source to make the necessary modifications to the data stored there.

At block 845, if applicable, the data retention and deletion system may also modify a portion of the ingested data that is associated with the relevant data for modification stored at the plurality of external sources. In other words, the data retention and deletion system may make the same modifications to the corresponding ingested data (from which the associated metadata was used to determine locations of relevant data for modification stored at the plurality of external sources) that originated from the relevant data stored at the plurality of external sources as a result of the ingestion process.

At block 850, if applicable, the data retention and deletion system may validate and regularly monitor whether the changes made previously persist in future ingestions of the data from the source system. This can be done using automated tools that flag to users if a previous change is no longer reflected in the incoming data. This validation provides an additional tool for users to track compliance on an ongoing basis.

Additional Implementation Details and Embodiments

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application." "software application." and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Java, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, IOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 9:
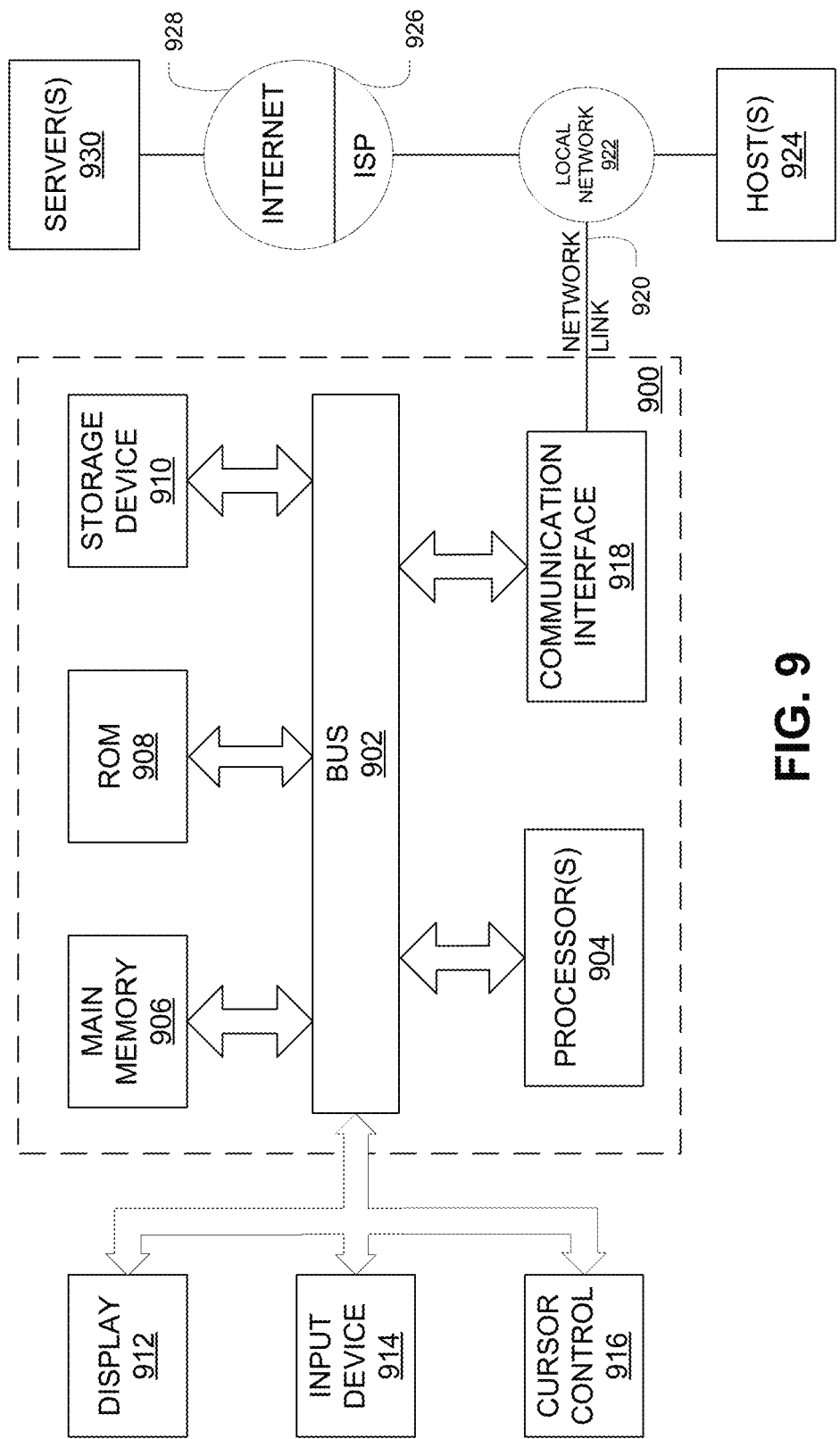
FIG. 9 illustrates a computer system with which certain methods discussed herein may be implemented.

For example, FIG. 9 is a block diagram that illustrates a computer system 900 upon which various embodiments may be implemented. Computer system 900 includes a bus 902 or other communication mechanism for communicating information, and a hardware processor, or multiple processors, 904 coupled with bus 902 for processing information. Hardware processor(s) 904 may be, for example, one or more general purpose microprocessors.

Computer system 900 also includes a main memory 906, such as a random access memory (RAM), cache and/or other dynamic storage devices, coupled to bus 902 for storing information and instructions to be executed by processor 904. Main memory 906 also may be used for storing temporary variables or other intermediate information during execution of instructions to be executed by processor 904. Such instructions, when stored in storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk, optical disk, or USB thumb drive (Flash drive), etc., is provided and coupled to bus 902 for storing information and instructions.

Computer system 900 may be coupled via bus 902 to a display 912, such as a cathode ray tube (CRT) or LCD display (or touch screen), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 900 may include a user interface module to implement a GUI that may be stored in a mass storage device as computer executable program instructions that are executed by the computing device(s). Computer system 900 may further, as described below, implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor(s) 904 executing one or more sequences of one or more computer readable program instructions contained in main memory 906. Such instructions may be read into main memory 906 from another storage medium, such as storage device 910. Execution of the sequences of instructions contained in main memory 906 causes processor(s) 904 to perform the process steps described herein. In alternative embodiments, hard-wired circuitry may be used in place of or in combination with software instructions.

Various forms of computer readable storage media may be involved in carrying one or more sequences of one or more computer readable program instructions to processor 904 for execution. For example, the instructions may initially be carried on a magnetic disk or solid state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN (or WAN component to communicated with a WAN). Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams.

The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

As described above, in various embodiments certain functionality may be accessible by a user through a web-based viewer (such as a web browser), or other suitable software program). In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could." "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A system comprising:
   a computer readable storage medium having program instructions embodied therewith; and
   one or more processors configured to execute the program instructions to cause the system to:
   access ingested data obtained from a plurality of external sources;
   receive a request from a user to modify a subset of the data from the plurality of external sources, wherein the subset of the data is associated with the user, wherein the request to modify the subset of the data includes a request to delete data associated with the user that is stored at one or more of the plurality of external sources;
   receive account identifiers associated with the user;
   search the ingested data using the account identifiers to identify relevant data for modification associated with the user, wherein the relevant data for modification is associated with the account identifiers;

access metadata associated with the relevant data for modification to determine locations of the plurality of external sources where the relevant data for modification is stored;
generate user interface data for a dashboard providing a visualization of the relevant data for modification and a data processing pipeline for processing the request to modify the subset of the data;
receive a confirmation to perform a modification operation;
perform an eligibility check on the account identifiers associated with the relevant data for modification based on applying eligibility rules to the account identifiers or referencing a list of eligible account identifiers;
determine, based on the eligibility check performed on the account identifiers, whether the relevant data for modification associated with the account identifiers is eligible for modification; and
generate instructions to modify the relevant data for modification stored at the one or more of the plurality of external sources based on determining from the eligibility check performed on the account identifiers that the relevant data for modification is eligible for modification.

2. The system of claim 1, wherein the program instructions further cause the system to modify a portion of the ingested data that is associated with the relevant data for modification.

3. The system of claim 1, wherein the instructions to modify the relevant data for modification comprise a script.

4. The system of claim 1, wherein the dashboard further provides a visualization of the modification operation as it is applied to the relevant data for modification, wherein the modification operation is determined based on a set of pre-configured modification logic.

5. The system of claim 1, wherein the dashboard further provides a visualization of the instructions to modify the relevant data for modification.

6. The system of claim 1, wherein a user interaction with the dashboard triggers the confirmation to perform the modification operation.

7. The system of claim 1, wherein the account identifiers associated with the user are provided by the user.

8. The system of claim 1, wherein the dashboard further includes a form for inputting the account identifiers associated with the user.

9. The system of claim 1, wherein the modification operation includes an anonymization or a deletion.

10. The system of claim 1, wherein the visualization indicates the dataset before the modification operation including the relevant data for modification and the dataset after the modification operation.

11. A computer-implemented method comprising:
accessing ingested data obtained from a plurality of external sources;
receiving a request to modify a subset of the data from the plurality of external sources, wherein the subset of the data is associated with a user, wherein the request to modify the subset of the data includes a request to delete data associated with the user that is stored at one or more of the plurality of external sources;
receiving account identifiers associated with the user;
searching the ingested data using the account identifiers to identify relevant data for modification associated with the user, wherein the relevant data for modification is associated with the account identifiers;
accessing metadata associated with the relevant data for modification to determine locations of the plurality of external sources where the relevant data for modification is stored;
generating user interface data for a dashboard providing a visualization of the relevant data for modification and a data processing pipeline for processing the request to modify the subset of the data;
receiving a confirmation to perform a modification operation;
performing an eligibility check on the account identifiers associated with the relevant data for modification based on applying eligibility rules to the account identifiers or referencing a list of eligible account identifiers;
determining, based on the eligibility check performed on the account identifiers, whether the relevant data for modification associated with the account identifiers is eligible for modification; and
generating instructions to modify the relevant data for modification stored at the one or more of the plurality of external sources based on determining from the eligibility check performed on the account identifiers that the relevant data for modification is eligible for modification.

12. The method of claim 11, further comprising performing an eligibility check on the account identifiers to determine whether the relevant data for modification is eligible for modification.

13. The method of claim 11, further comprising modifying a portion of the ingested data that is associated with the relevant data for modification.

14. Non-transitory computer storage media storing program instructions that when executed by one or more computers, cause the one or more computers to perform operations comprising:
accessing ingested data obtained from a plurality of external sources;
receiving a request to modify a subset of the data from the plurality of external sources, wherein the subset of the data is associated with a user, wherein the request to modify the subset of the data includes a request to delete data associated with the user that is stored at one or more of the plurality of external sources;
receiving account identifiers associated with the user;
searching the ingested data using the account identifiers to identify relevant data for modification associated with the user, wherein the relevant data for modification is associated with the account identifiers;
accessing metadata associated with the relevant data for modification to determine locations of the plurality of external sources where the relevant data for modification is stored;
generating user interface data for a dashboard providing a visualization of the relevant data for modification and a data processing pipeline for processing the request to modify the subset of the data;
receiving a confirmation to perform a modification operation;
performing an eligibility check on the account identifiers associated with the relevant data for modification based on applying eligibility rules to the account identifiers or referencing a list of eligible account identifiers;
determining, based on the eligibility check performed on the account identifiers, whether the relevant data for modification associated with the account identifiers is eligible for modification; and generating modification instructions to modify the relevant data for modification stored at the one or more of the plurality of external sources based on determining from the eligibility check performed on the account identifiers that the relevant data for modification is eligible for modification.

15. The non-transitory computer storage media of claim 14, wherein the program instructions, when executed, further cause the one or more computers to perform an eligibility check on the account identifiers to determine whether the relevant data for modification is eligible for modification.

16. The non-transitory computer storage media of claim 14, wherein the program instructions, when executed, further cause the one or more computers to modify a portion of the ingested data that is associated with the relevant data for modification.

* * * * *